J. H. BEAL.
OILER FOR CAMS.
No. 183,108. Patented Oct. 10, 1876.
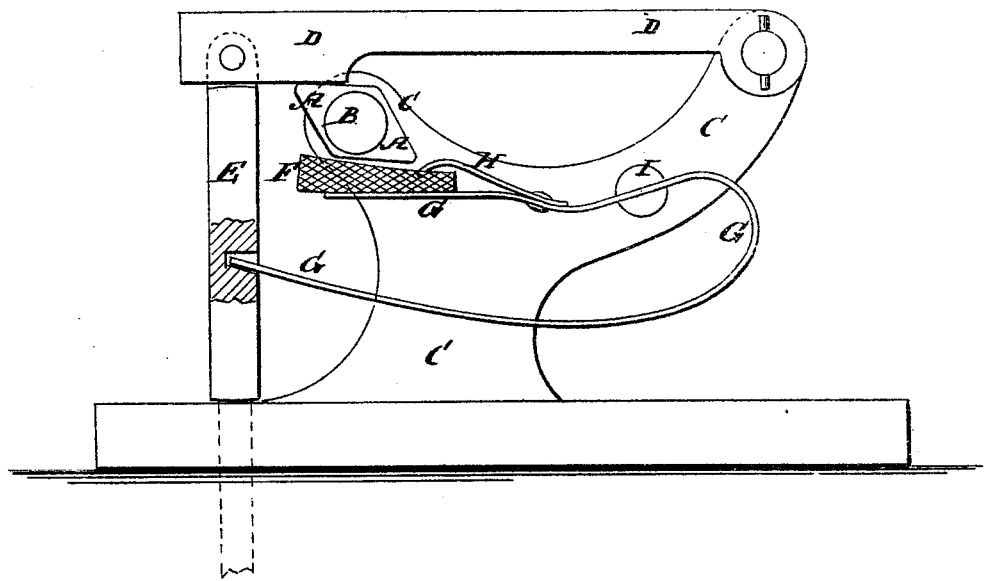

UNITED STATES PATENT OFFICE.

JOHN HENRY BEAL, OF CANTON, MASSACHUSETTS.

IMPROVEMENT IN OILERS FOR CAMS.

Specification forming part of Letters Patent No. 183,108, dated October 10, 1876; application filed July 31, 1876.

*To all whom it may concern:*

Be it known that I, JOHN H. BEAL, of Canton, in the county of Norfolk and State of Massachusetts, have invented a new and useful Improvement in Oiler for Cams, of which the following is a specification:

The figure represents a cam to which my improved oiler has been applied. The object of this invention is to furnish an improved oiler for cams, which shall be simple in construction, conveniently applied, and effective in operation, keeping the cam and stud constantly oiled, and thus lessening the friction and wear.

The invention consists in the combination of a piece of oil-saturated felt, and its spring-holder, with a cam, to keep said cam constantly oiled, as hereinafter fully described.

A represents a cam, the shaft B of which revolves in bearings in a frame, C. D represents a stud, upon which the cam A operates, to give a reciprocating motion to a shaft or bar, E. F is a piece of felt, which is kept saturated with oil, is placed upon the end of a spring, G, and is secured to said spring by a spring-clamp, H, or other convenient means. The spring G is secured to a slotted pin, I, or other suitable holder, attached to the frame C. The other end of the spring G may be extended and secured to the shaft or bar E, or other convenient support. By this construction the elasticity of the spring G holds the saturated felt F always pressed against the cam A, and thus keeps the said cam constantly oiled. After the felt F has been once saturated a few drops of oil will last for days, so that it uses oil very economically.

Having thus described my invention, I claim as new and desire to secure by Letters Patent—

The combination of a piece of oil-saturated felt, F, and its spring-holder G, with a cam, A, to keep said cam constantly oiled, substantially as herein shown and described.

JOHN H. BEAL.

Witnesses:
   THOMAS E. GROVER,
   SAMUEL H. CAPEN.